United States Patent [19]

Stecklum et al.

[11] 4,239,120
[45] Dec. 16, 1980

[54] DEVICE FOR THE BUNKERING AND ASSORTED FEEDING OF SMALL PARTS

[75] Inventors: Klaus Stecklum; Norbert Grief, both of Aachen, Fed. Rep. of Germany

[73] Assignee: Rhein-Nadel Automation Gesellschaft mit beschränkter Haftung, Aachen, Fed. Rep. of Germany

[21] Appl. No.: 69,663

[22] Filed: Aug. 24, 1979

[30] Foreign Application Priority Data

Aug. 28, 1978 [DE] Fed. Rep. of Germany ....... 2837419

[51] Int. Cl.³ ................................................. B07C 5/12
[52] U.S. Cl. ..................................... 209/682; 209/910; 209/914; 209/917; 209/920; 198/616
[58] Field of Search ............. 209/910, 912, 914, 917, 209/920, 921, 923, 703, 682; 414/327, 325; 198/616, 550–554, 396; 221/159–162, 253, 254

[56] References Cited

U.S. PATENT DOCUMENTS

| | | | |
|---|---|---|---|
| 2,232,210 | 2/1941 | Carroll | 209/910 X |
| 2,937,738 | 5/1960 | Albertoli et al. | 198/396 X |
| 3,079,042 | 2/1963 | Sterling | 414/327 X |
| 3,463,296 | 8/1969 | Eisen | 198/616 X |
| 3,590,979 | 7/1971 | Lupo | 198/550 |
| 3,770,123 | 11/1973 | Mraz | 209/912 X |
| 3,882,994 | 5/1975 | Mecks | 198/554 X |
| 4,171,747 | 10/1979 | Metzger | 209/914 X |

Primary Examiner—Allen N. Knowles
Attorney, Agent, or Firm—Martin A. Farber

[57] ABSTRACT

A device for the bunkering and sorted feeding of small parts, particularly to processing machines, by which the small parts are removed from a bunker space in the bottom area of the bunker, which bunker space is refillable from the top, and via an intermediate inserted lifting unit are fed into the inlet prechamber of a sorting stretch, the latter being formed for example in the shape of a vibrating conveyor. The bunker, lifting unit and sorting section are accommodated in a container, such that the lifting unit rends with the upper end of the lifting device in front of the inlet prechamber of the sorting stretch. The subspace is partitioned-off relative to the bunker space, and the lifting unit is arranged in the subspace of the container, the lifting unit conveying-up rises transversely relative to the bunker outlet opening. The sorting stretch extends on the upper longitudinal edge of the container in a direction opposite to the bunker outlet direction.

6 Claims, 4 Drawing Figures

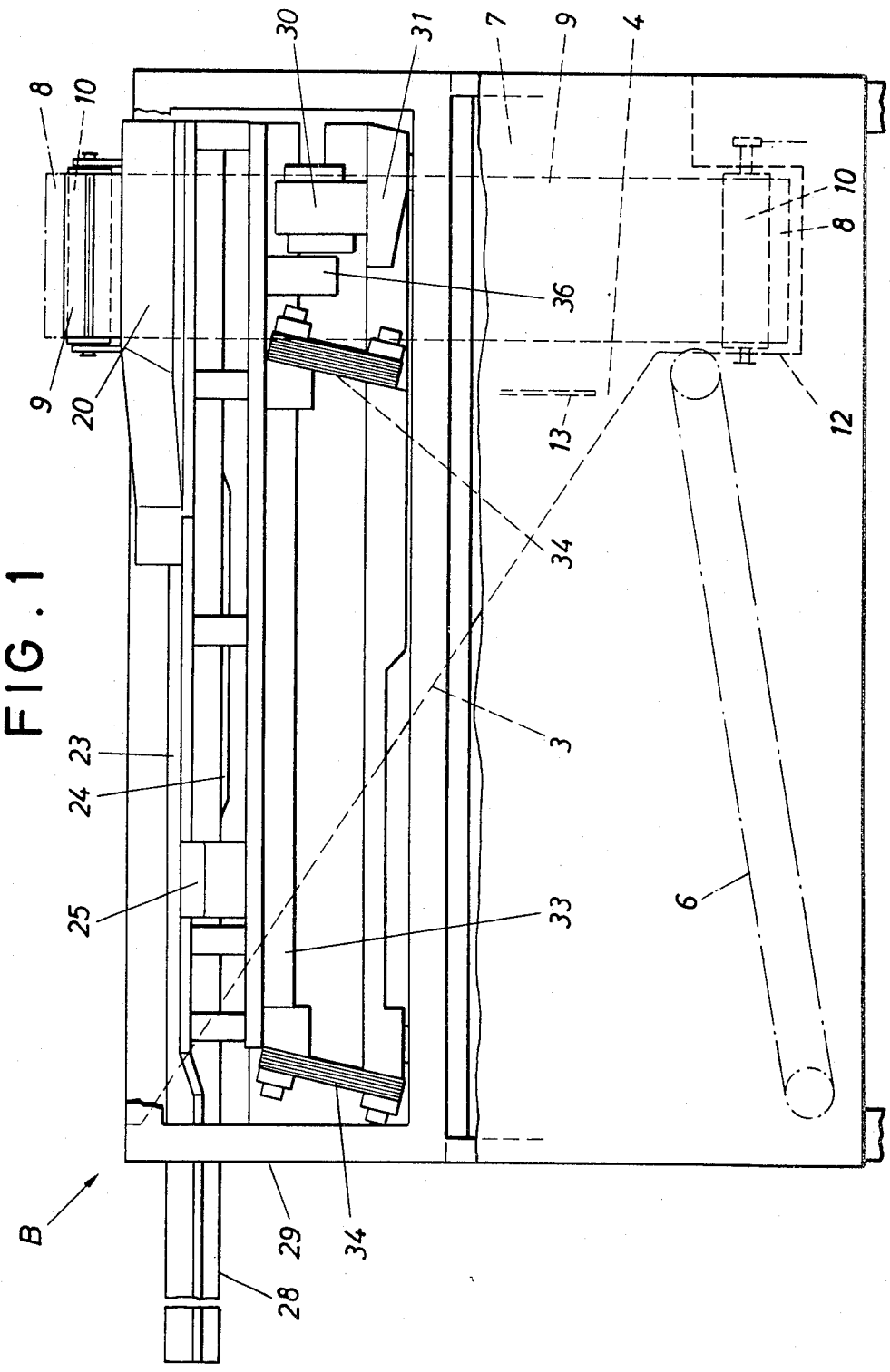

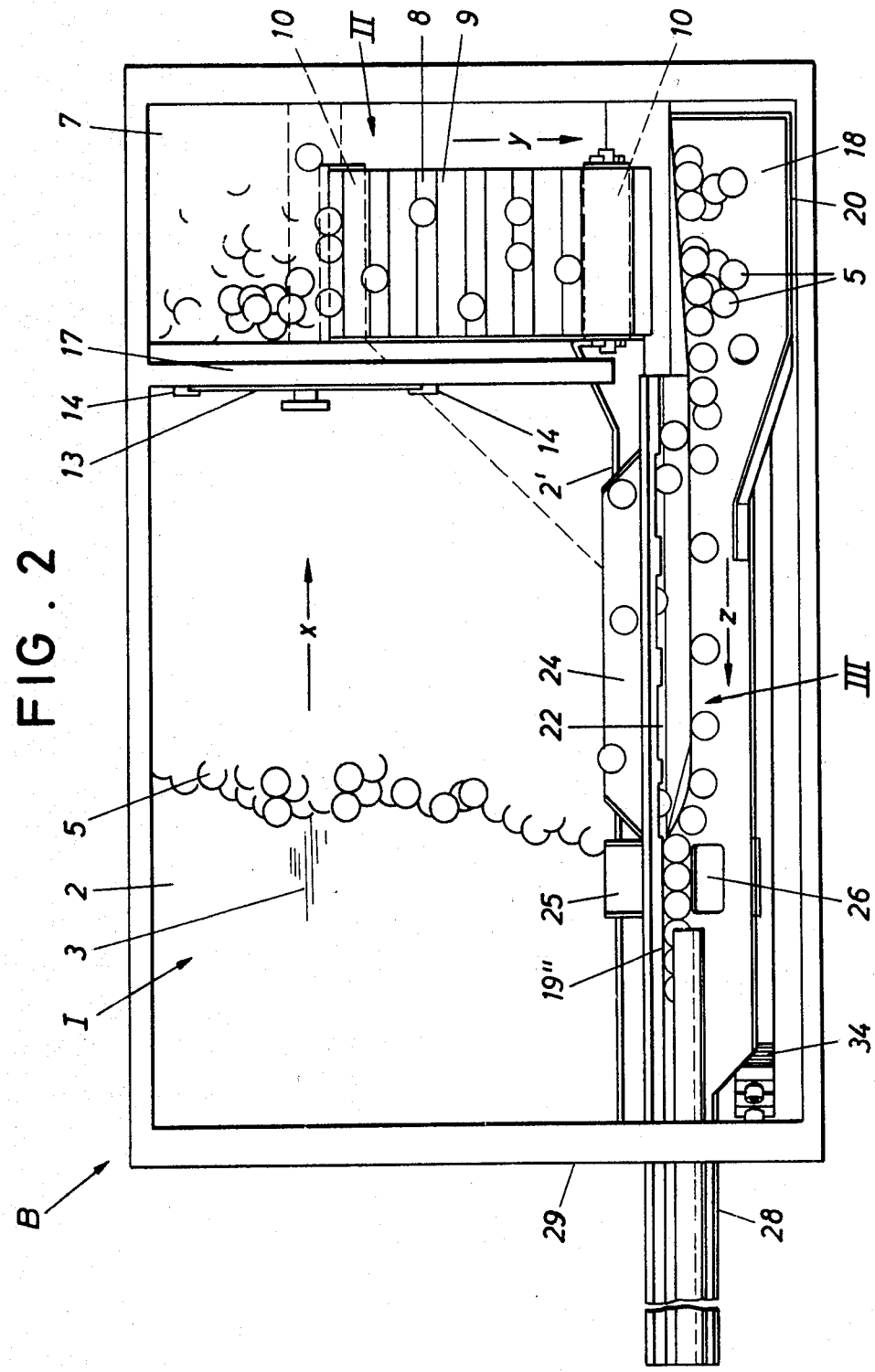

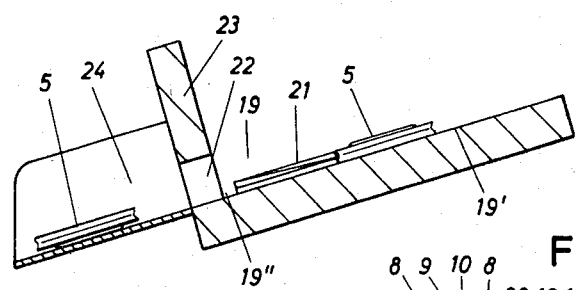
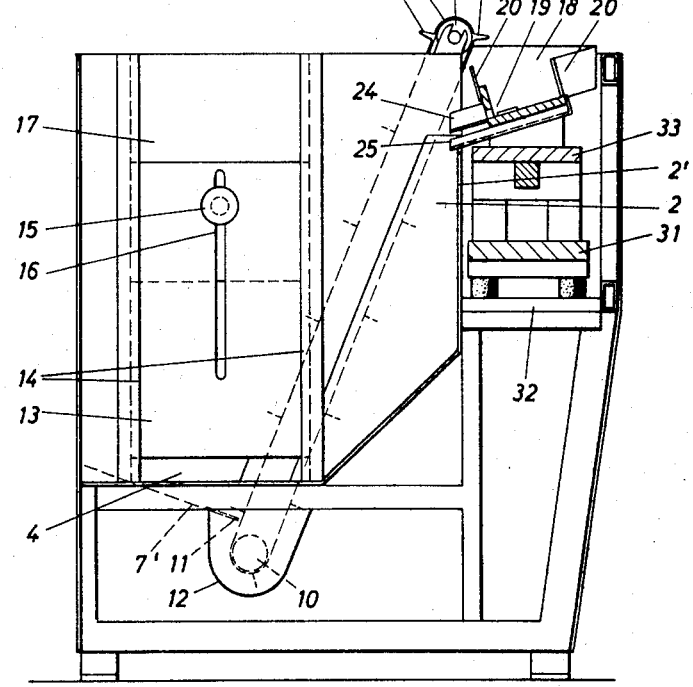

DEVICE FOR THE BUNKERING AND ASSORTED FEEDING OF SMALL PARTS

The invention relates to a device for the bunkering and sorted feeding or conveying of small parts, particularly to processing machines, by which the small parts are removed from a bunker space in the bottom area of the bunker, which bunker space is refillable from the top, and via an intermediate inserted lifting unit are fed to the inlet prechamber of a sorting stretch, the latter being formed for example in the shape of a vibrating conveyor or feeder.

With known systems the named elements of the device are assembled into a working unit. This leads to a considerable need of space. Moreover the constructional expense is considerable insofar as all elements must be provided with a base construction and foundation pedestal, respectively. The area under the floor or underground area basically is not useable. In order to attain a loading level which is correct for machines, a level equalization is required. This in turn presumes special elevation adjustment devices. Thus for instance changes were made lifting the discharge plane (lying at the level of the bunker floor or bottom) over the sorting stretch section, which sorting stretch section is constructed as a swinging or vibration conveyor. The loading of the bunker which takes place from above presumes correspondingly overlength or protracted lifting units. A further disadvantage of the known devices resides finally in that the inlet prechamber of the vibrating conveyors, which conveyors are designed in the shape of a funneled pot or container with a sorting stretch section ascending in spiral shape, have practically speaking only a small or limited prestorage capacity because too large a filling degree impedes the sorting operation.

It is a task of the present invention, particularly, i.e., additionally to the objectives resulting from the specification and claims, to construct a device for the bunkering and assorted feeding of small parts with a small spacial requirement, large prestorage capacity and lowest possible filling-up level such that nevertheless the working efficiency and sorting quality are increased.

This task is solved by the invention set forth in claim 1.

The dependent claims are advantageous further formations or improvements of the subject matter of the invention.

As a consequence of such formation a device in accordance with the generic type of increased function value or serviceability is created: bunker, lifting unit and sorting stretch section are integrated in a manner such that the spacial requirement is considerably reduced in spite of a considerably increased prestorage capacity. With respect to the container, to begin with it starts out from a cornered or angular plan view. For the conveying course, the sides which are available for use are advantageously utilized in the manner that two parallel stretch sections are reserved for the opposite working inlet supply and outlet and a transverse stretch section is reserved for the level change of the goods to be fed. If mainly light weight small parts are to be conveyed, then a variation of the plan view is advantageous in the manner that the opposite working stretch sections of the conveying path are reserved for the longer sides of a rectangle whereas the shorter side of the rectangle can be used as a lifting conveying stretch section, which section is to be formed steep. If the ascending stretch must be formed flatter or shallower, for example for the conveying of heavy-weight sorting goods, the plan view can be correspondingly selected differently or can be devised for the improved conveying by means of an electromagnetic or mechanical operating device. The bulkheaded or partitioned-off subspace space of the container keeps the lifting unit as free from load or stress as possible, in the manner that the mass or bulk of the small parts is held back or retained in the bunker space. The sorting goods are fed via the lifting unit to an inlet prechamber, the latter being precedingly interconnected with the sorting stretch. Thus the goods are not thrown or heaped onto the sorting elements. From the inlet prechamber the sorting goods now move into the actual sorting stretch section, the latter running or extending on the upper longitudinal edge of the container and disposed opposite relative to the bunker outlet direction. This sorting stretch section lies above the bunker space, i.e., the rear passageway area of the sorting stretch section can be fully utilized additionally as a bunker space. The construction measure that the sorting stretch section has fallback chutes lying one behind the other and entering into the bunker space, brings the advantage that the sorted out parts do not fall back on the actual sorting stretch section and impair the sorting operation; the goods are, rather, fed once again into the circuit. In the manner that a metering slider is coordinated to the passage opening in the wall, which wall bulkhead-partitions off the subspace, an optimum inlet supply regulation is achieved with individual adjustment to the nature of the sorting goods. An advantageous construction form resides further in that the bunker space is constructed as a transportation container, that is separateable from the bulkheaded-partitioning wall. Such transportation containers which are also commonly used as storage containers, can be conveniently or easily coordinated by customary or conventional coupling means. Since the bottom or floor of the bunker space practically speaking can lie in the vicinity of the support surface or base of the device, also with respect to the sorting stretch section a loading or feeding level which is proper or appropriate for the machine is achieved. The transfer of the sorted goods to processing machines, packaging machines or the like is advantageous in the manner that the outlet end of the sorting stretch section projects freely over the narrow wall on the side of the bunker space, which sorting stretch section is formed as a linear sorting feeder or conveyor, for example, with an electromagnetic drive or simply as a conveyor belt. The bunker weight is most favorably used for the stabilization of the device. Even with large or extensive swinging or vibrating amplitude, the moment of inertia, which inertia is to be derived or drawn from the housing and contents, proves to be so sufficient that retaining or fastening means can be dispensed with. A further advantage of the new device as opposed to the conventional swinging or oscillating conveyors with separate bunkers is the low noise level. The speed of the parts during the transportation via the linear stretch section can be regulated and consequently the efficiency of the conveyor unit can be adjusted to the take-up performance of the machines.

Further advantages and particulars of the subject matter of the invention are more closely explained in the following on the basis of an embodiment example which is illustrated in the manner of a drawing. There show:

FIG. 1 the device formed in accordance with the invention in front elevation view with the front wall partially broken away, FIG. 2 a top plan view of this and FIG. 3 a cross-section through this device, FIG. 4 a removed and enlarged cross-section through the sorting stretch of the linear swing feeder.

The device combining and comprising the bunker or bin I, the lifting unit II and the sorting stretch section III possesses a container B of cornered or angular plan view. The bunker space 2 occupies the portion of largest volume. The bottom 3 of the bunker space 2 drops-off or slopes in the direction of a bunker-removal or outlet opening 4. The sorting goods which are formed (in the present case) of ring wheels or discs 5 sequentially slide correspondingly in the direction of the outlet opening. The outlet direction is designated by the arrow x. If a conveyance of the goods which are to be sorted, which conveyance is based on gravity, is to be dispensed with, in the bottom range of the bunker, a conveyor belt 6 can be installed practically speaking just above the standing surface or base of the container B. This makes possible an optimum utilization of the portion of space available for the bunker I.

The goods which are to be sorted, passing through the bunker outlet opening 4, move into a subspace 7 of the container B, the subspace 7 being bulkhead partitioned off or compartmentalized toward the bunker space I. The lifting unit II is arranged in this subspace. The lifting unit II is a conveyor belt 9, on which lands or studs are set, the conveyor belt being placed into rotation by an electric-drive motor which is not illustrated in further detail, the conveyor belt running over guide rollers 10. The conveyance direction is designated with y. The conveyance direction lies transversely relative to the removal or outlet direction y of the goods which are to be sorted. The lifting unit takes over the goods which are to be sorted (when they have moved through the outlet opening) at the deepest point of the subspace 7, the latter being constructed as a transverse chute. The bottom 7' of the subspace 7 slopes gently or slightly in the direction of the upper conveying runner, so that the ring wheels or discs 5 slide onto the lands or studs 8. The bottom 7' continues into an elastic lip 11 or trough. A lip, which ends close to or shortly in front of the high-conveying or rising runner of the conveyor belt 9, on the other hand prevents the wheels or discs from reaching or moving into the deeper trough 12 of the subspace 7.

The feeding of the sorting goods is dosable or meterable. For this purpose the outlet opening 4 is variable in its passageway cross-section. This is achieved by means of a metering or dosing slide 13. The latter runs in vertical guides 14 and may be adjusted and locked by means of a clamping device. Concerning the clamping device it is a screw having an enlarged setting handle 15. This screw passes through a slot 16, the latter extending in the direction of displacement. The shank or shaft of the screw engages either in a counterthread of the wall 17 of the container B, which wall 17 bulkhead-partitions off/or compartmentalizes the partial space 7, or it passes through a bore in this wall 17, in order to engage in a nut disposed on the other side of the wall 17, which nut has a corresponding handle.

The lifting device II ends above an inlet prechamber or antechamber 18 of the sorting stretch section III, the latter conveying opposite to the bunker outlet direction x.

The corresponding conveying direction is designated with z. The goods which are to be sorted take a U-shaped conveyance path. The sorting stretch section III lies at the upper longitudinal edge of the container B. It concerns a so-called linear sorting conveyor with a conveyor channel 19, the latter connecting with the inlet prechamber 18.

Its channel floor or bottom 19' is formed narrower than that of the inlet prechamber 18, which prechamber is surrounded by a limiting or boundary band or belt 20. The bottom 19' of the horizontally extending sorting stretch slopes slightly downwardly in the direction of the bunker space and is provided with sorting elements 21 and 22. Because sorting elements 21 and 22 are adjustable to the respectively prevailing sorting goods at the time, a more explicit description may be dispensed with. The sorting elements 22 are constructed as passageway or penetration openings of the channel wall 23 on the side of the bunker space. A fall-back chute 24 which is formed as a slide connects or adjoins at the level of the channel bottom. This chute 24 projects over the intermediate wall 2' of the bunker space which is located there, so that the sorted-out ring wheels or disks again arrive in the bunker space 2. The sorting stretch section has several passageway openings 22 which are arranged one after the other in the conveyance direction. The fall-back chute 24 is constructed for this reason as a continuous chute. An additional fall-back chute 25 connects, adjoins or follows on this chute 24 in the conveyance direction. The chute 25 extends spaced underneath the channel bottom 19'. There in the channel bottom there is disposed a drop-through opening 26. The latter has a width which is somewhat larger than the diameter of the ring wheel or disc 5. The opening 26 moreover is located at such a distance or spacing relative to the channel bottom 19' (the latter supporting the disc or plates in the declining direction) that upon jamming or obstruction of removal, the sorted following pieces can be directed into the drop-through shaft 26, whereby they are switched or thrown once again into the sorting circuit.

The outgoing end 28 of the sorting stretch section III projects over the narrow wall 29 there on the side of the bunker space. The narrow wall here has a corresponding opening, the latter taking into consideration or allowing for the amplitude of the oscillations, the opening not being illustrated in more detail. The free projection of the outgoing end 28 offers a favorable precondition for the takeover of the goods that have been sorted properly in position. The linear swinging feeder or vibrating conveyor includes an electromagnetic drive 30. The latter is secured on a base rail 31. This rests on or is supported by transverse carriers 32 of a carrier frame. A carrier 33 runs parallel above this base rail. The conveyance channel 19 is rigidly connected with the carrier 33. The carrier and the base rail are connected via spring packets 34, the latter being positioned slightly inclined opposite to the feeding direction. The horizontal vibration which is exerted by means of a rotor or armature 36 on the carrier 33 is transmitted in a hurling or projectile movement, the hurling movement being in the feed direction z.

The bunker space which is formed in the embodiment example as a firm or fixed integral component of the container B can also be constructed as a transportation container which is separateable from the bulkhead partitioned-off wall 17. The transport container would in that case be connected via suitable coupling means with the device which would comprise the lifting unit and sorting stretch section. In this case the container would have in its turn a lockable or closeable opening in the range of the cross-sectionally variable passage opening 4.

We claim:

1. In a device for the bunkering and sorted feeding of small parts, particularly to processing machines, by which the small parts are removed from a bunker space in the bottom area of the bunker, which bunker space is refillable from the top, and via an intermediate inserted lifting means are fed into an inlet prechamber of a sorting stretch section, the latter being formed for example in the shape of a vibrating conveyor, the improvement comprising a container having an upper longitudinal edge and defining a bunker, the bunker having a bunker space, the lifting means and the sorting stretch section are accommodated in said container, means for partitioning said chamber into a subspace partitioned from the bunker space and defining a bunker outlet opening communicating therebetween, a bunker outlet direction thereby being defined, said lifting means for conveying the small parts rising upwardly in a direction transversely to the bunker outlet opening, said lifting means being arranged in said subspace of said container, said lifting means having an upper end thereof ending in front of the inlet prechamber of said sorting stretch section, said sorting stretch section extending on an upper longitudinal edge of said container opposite to the bunker outlet direction.

2. The device according to claim 1, wherein
the sorting stretch section includes fall-back chutes disposed one behind another, said chutes discharge into said bunker space.

3. The device according to claim 1, wherein
said partitioning means includes a wall,
metering slide means for defining the size of said bunker outlet opening in said wall.

4. The device according to claim 1, wherein
said partitioning means comprises a bulkhead wall, the bunker with the bunker space is constructed as a transportation container, the latter is separateable from said bulkhead wall.

5. The device according to claim 1, wherein
said container has a narrow wall defining one end of the bunker space,
the sorting stretch section has an outlet end which freely projects over said narrow wall,
the sorting stretch section constitutes a linear-vibrating conveyor.

6. The device according to claim 1, wherein said container is formed with corners.

* * * * *